United States Patent [19]

Van Tassel et al.

[11] Patent Number: 5,050,989
[45] Date of Patent: Sep. 24, 1991

[54] SINGLE HADAMARD MASK SPECTROGRAPH SYSTEM

[75] Inventors: Roger A. Van Tassel, Hollis, N.H.; Wallace K. Wong, Lexington, Mass.

[73] Assignee: The United States of America as represented by the Secretary of the Air Force, Washington, D.C.

[21] Appl. No.: 410,388

[22] Filed: Sep. 21, 1989

[51] Int. Cl.$^5$ ............................ G01J 3/06; G01J 3/36
[52] U.S. Cl. ...................................... 356/310; 356/330
[58] Field of Search ................................ 356/310, 330

[56] References Cited

U.S. PATENT DOCUMENTS

| | | | |
|---|---|---|---|
| 3,578,980 | 5/1971 | Decker, Jr. et al. | 250/237 G |
| 3,859,515 | 1/1975 | Radcliffe, Jr. | 235/164 |
| 3,955,891 | 5/1976 | Knight et al. | 250/237 G |
| 4,007,989 | 2/1977 | Wajda | 356/310 |
| 4,435,838 | 3/1984 | Gourlay | 382/68 |
| 4,442,454 | 4/1984 | Powell | 358/167 |
| 4,580,162 | 4/1986 | Mori | 358/135 |

OTHER PUBLICATIONS

Harwit et al., "Doubly Multiplexed Dispersive Spectrometers", Applied Optics, vol. 9, No. 5, May 1970, pp. 1149-1154.

Primary Examiner—Vincent P. McGraw
Attorney, Agent, or Firm—William G. Auton; Donald J. Singer

[57] ABSTRACT

A Hadamard mask is placed in the entrance plane of a standard flat field grating spectrograph. A planar array is used as the detector. The Hadamard mask contains $2n-1$ elements, where n is the number of elements in the detector array. This configuration produces a spectrograph with a wide aperture and hence high throughput, and allows rapid spectral measurements with no moving parts. It also allows simultaneous measurement of a randomly occurring pulse source.

2 Claims, 1 Drawing Sheet

SINGLE HADAMARD MASK SPECTROGRAPH SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to spectroscopy, and more specifically the invention pertains to a Hadamard spectrograph configuration which will significantly increase the throughput, and hence the sensitivity, of a conventional, single-slit, planar detector array electronic spectrograph.

Recently, a technique known as Hadamard spectroscopy has been developed. The basic idea of conventional Hadamard spectrometers as follows. In order to determine the spectrum of a beam of light, instead of measuring the intensity at each wavelength separately, the spectral components are combined in groups and the total intensity of each group is measured. The different wavelength components are thereby multiplexed onto a single detector. As a result, the spectrum is determined much more accurately, than with conventional spectrometers. Further details regarding the distinction between Hadamard spectroscopy and conventional spectroscopy are discussed briefly below.

In conventional spectrometers, a beam of energy composed of the separate wavelengths to be analyzed is passed through an entrance slit, collimated and then passed through a dispersive element to disperse the band into a spectrum and decollimated so that the separate wavelengths are spatially spread out on the exit plane. An exit slit is used to pass only a narrow band of the wavelengths to a detector and the individual wavelengths are analyzed or scanned by mechanically moving either the dispersive element or the slit. The slit needs to be relatively narrow to achieve fine resolution so that the energy passed by the slit is relatively small in comparison to the energy of the whole spectrum being scanned. The detector thus measures only the relatively small signal in the passband for a relatively short time compared with the total time of observation so that the signal-to-noise ratio is relatively low.

The conventional photodiode array electronic spectrograph uses a monochromator with a single entrance slit but many detectors in the exit plane. Usually the width of the entrance slit is the same as the width of a single element on the detector array to achieve maximum spectral resolution with the particular array. The advantage of this system is that all wavelengths are measured simultaneously. The disadvantage is that the small aperture of the entrance slit severely limits the amount of light which may pass into the instrument.

The basis of conventional Hadamard transform spectroscopy is to measure groups of wavelengths simultaneously on a single detector in order to improve the signal-to-noise ratio. This could be implemented by placing a series of masks at the exit plane of spectrometer, however a much more efficient design, and therefore the one usually implemented, is to use a cyclic mask and then step the mask, making a measurement at each step of the mask. This reduces the number of mask elements which are required from $n^2$ to $2n-1$. For each mask or mask position a different combination of spectral elements falls on the detector. Intensities measured with n different masks can be used to compute the intensities of n different spectral elements.

Doubly encoded Hadamard transform spectrometers use masks at both the entrance and exit plane and offer advantages of both multiplexing and wide aperture.

The task of applying Hadamard mask technology to conventional photodiode array spectrograph systems is alleviated, to some extent, by the systems disclosed in the following U.S. Patents, the disclosures of which are incorporated herein by reference:

U.S. Pat. No. 4,007,989 issued to Wajda;
U.S. Pat. No. 4,580,162 issued to Mori;
U.S. Pat. No. 4,442,454 issued to Powell;
U.S. Pat. No. 4,435,838 issued to Gourlay;
U.S. Pat. No. 3,955,891 issued to Knight et al.; and
U.S. Pat. No. 3,578,980 issued to Decker.

While the above cited references are instructive, the ongoing task remains to increase the performance of conventional photodiode array spectrograph systems, and the present invention is intended to satisfy that need.

SUMMARY OF THE INVENTION

The present invention is a Hadamard spectrograph system which places a Hadamard mask at the entrance plane of a single-slit, photodiode-array spectrograph. The use of a multislit mask increases the throughput and hence the sensitivity of the system. It contains no moving parts. One embodiment of the invention uses:

a light source, a collimating lens, a Hadamard mask, a concave grating as a dispersion element, and a photodiode array to detect radiation. The Hadamard mask is used in place of the single slit which normally is used as the entrance aperture.

The light source is used to illuminate a test sample for spectroscopic analysis. The collimating lens directs light from the source onto the test sample, and onto the Hadamard mask. The Hadamard entrance mask consists of $2n-1$ elements, where n is the number of detector elements or pixels in the detector array. The use of the multislit Hadamard mask significantly increases the effective aperture of the monochromator.

In operation, the Hadamard mask has $2n-1$ slots arranged in an array that forms a mask pattern of opaque and transparent slots. The mask use a cyclic S-matrix which is composed of 1's and 0's. As the mask pattern is formed, the spectrum of the light from the test sample is encoded with the mask pattern.

Once the light from the test sample passes through the Hadamard mask, it continues through the monochromator. It receives and disperses incoming radiation from the Hadamard mask onto an n element detector array which is placed at the back focal plane of the monochromator. The detector array reads out the radiation field electronically. The spectrum is recovered by a matrix multiplication of the signal from the array.

The advantage of this system is that the Hadamard mask effectively enlarges the aperture by half the number of detector elements in the detector array. In conventional spectroscopic systems, the entrance aperture is a single slit which has a width which equals that of one of the elements in the detector array. As a result, very little light gets through to the detector. Since all detectors put out some unwanted noise, the detectors have limited sensitivity, they can't see weak signals propagated through the aperture when their own noise interferes with them. The Hadamard spectrograph adds light from many wavelengths on each element, and the detector gets a strong signal. As described above, it is a principal object of the present invention to increase the throughput and sensitivity of conventional single-slit, planar-array, spectrograph systems by replacing the single-slit aperture with a Hadamard mask which contains many entrance apertures.

It is another object of the present invention to provide a planar-detector array spectrograph system with improved signal-to-noise ratios.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a Hadamard spectrograph system which replaces the entrance slit of a single-slit, photodiode array, detection system with a Hadamard mask. This increases the sensitivity of the system.

Figure 1:
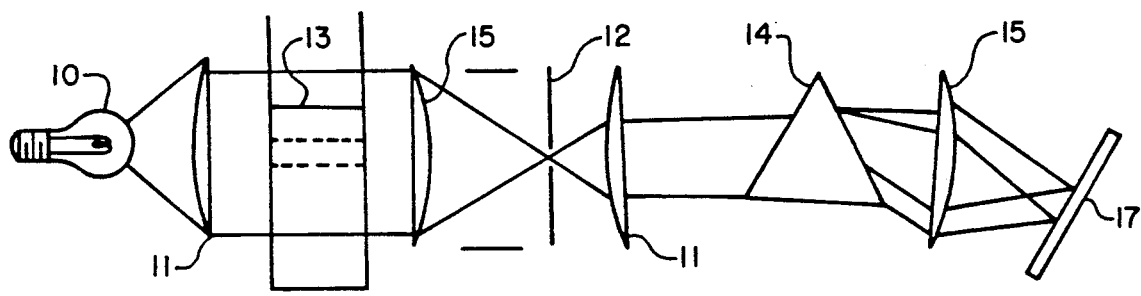
FIG. 1 is an illustration of a prior art single slit spectrograph system.

The reader's attention is now directed towards FIG. 1, which is an illustration of a conventional single-slit spectrograph system used for spectrographic analysis of a test sample 13. The system of FIG. 1 uses: a wide band light source 10, two collimating lenses 11, a single slit aperture 12, a prism dispersion element 14, two decollimating elements 15, and a photodiode detector array 17.

The first collimating lens 11 directs the light from source 10 onto the test sample 13. This light passes through the sample through the first decollimator 15 to the single-slit aperture. The test sample of FIG. 1 is shown to be a liquid within a transparent container, but may actually be any spectroscopic subject of interest.

The light from the slit 12 is directed by the second collimator 11 onto the prism dispersion element 14. This dispersion element 14 will spatially spread out the separate bands of the spectrum in an output which is focused by the second decollimator 15 onto the photodetector 17. Note that other dispersion elements can be used in place of the prism, including a concave grating which gives both dispersion and focusing.

The spectroscopic system of FIG. 1 admits light from a wide-band source through a single-slit aperture. As a result, very little of the light from the source gets through to the sample 13 and the detector 17. Since all detectors put out unwanted noise, they have limited sensitivity and can't see weak signals which are propagated through the aperture when their own noise is greater than the signal level.

Figure 2:
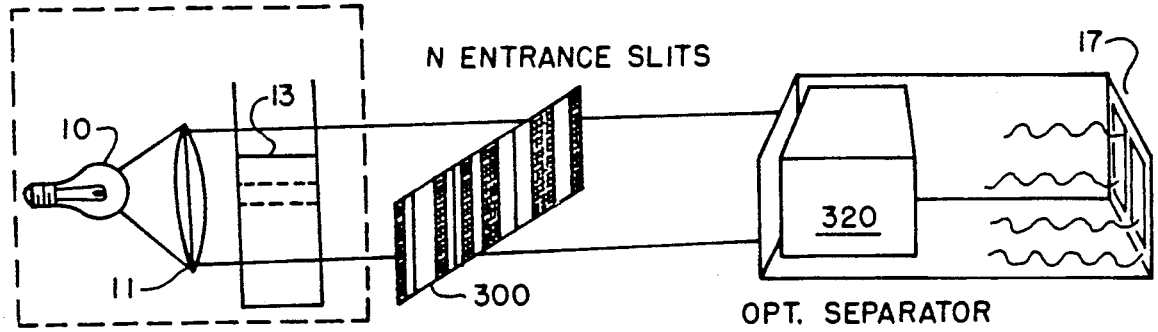
FIG. 2 is an illustration of the preferred embodiment of the present invention.

The reader's attention is now directed towards FIG. 2, which is an illustration of the preferred embodiment of the present invention. The system of FIG. 2 obtains a spectroscopic reading that identifies the nature of a test sample 13 using: a wide-band, wide-field, light source 10, a collimating lens 11, a Hadamard mask 300, a monochromator 320, and a photodiode array 17. The light source may emit ultraviolet, visible, near infrared, or far infrared light.

The present invention may be used to determine the spectrum of a source by using fore-optics instead of the source (10) and sample (13). Note that in the description that follows, the words "test sample" are used with respect to element 13 of FIG. 2. However, in the context of the present invention, the words "test sample" can include a self-emitting test subject, such as the atmosphere, or any other spectroscopic subject. For this reason, all of the elements within the dashed lines of FIG. 2 should be considered optional, and are not essential for the practice of this invention.

The collimating lens 11 directs light from the source 10 onto the test sample 13. Light from the test sample then passes through the Hadamard mask 300 into the monochromator 350. The operation of the Hadamard mask 300 itself is as described in two sources, the disclosures of which are incorporated herein by reference: a text by MARTIN HARWIT and NEIL J. A. SLOANE, entitled *HADAMARD TRANSFORM OPTICS*, published by ACADEMIC PRESS, NEW YORK, 1979 and a technical article entitled "PROTOTYPE HADAMARD SPECTROMETER USING CURVED SLITS" BY ROY W. ESPLIN, G. A. VANASSE, D. J. BAKER and R. J. HUPPI, AFGL-TR-78-0232, 22 SEPTEMBER 1978. The operation of the Hadamard mask is described in these references, and is summarized briefly below.

The intent of Hadamard spectroscopy is to increase the sensitivity of dispersive spectrometers by using encoding masks based on Hadamard matrices to encode the optical energy. Hadamard encoding masks are based upon Hadamard matrices. Hadamard matrices are square matrices whose elements are $+1$'s and $-1$'s and which satisfy $$HH^T = NI, \qquad (1)$$

where H is a Hadamard matrix, $H^T$ is the transpose of H, I is the identity matrix and N is a scalar equal to the rank of the matrix H. It follows from Equation 1 that the rows of a Hadamard matrix are orthogonal.

In the Hadamard spectrograph described here, the mask consists of opaque and transparent elements. This results in mask entries that consist of 0's and 1's. There is a standard way of going from a Hadamard mask with entries of $+1$ and $-1$ to a matrix with entries of 0 and 1. This procedure is described in the above referenced text and results in an S-matrix. The three known constructions of cyclic S-matrices are also given in the above-referenced text. In the present invention, the entrance slit of a conventional dispersive spectrometer is replaced with an encoding mask to produce a spectrometer with a wide aperture advantage. The photodetector 17 of FIG. 3 receives a portion the mask pattern of the Hadamard mask 300 disposed upon its photoconducting surface. This mask pattern is identifiable and recognizable. It contains the information necessary to reconstruct the spectrum.

In the system of FIG. 2, the mask 300 has $2n-1$ slots arranged in an array that forms a mask pattern of opaque and transparent slots. As the mask pattern is formed, the spectrum of the light from the test sample is encoded with the mask pattern.

Once the light from the test sample passes through the Hadamard mask, it continues through the monochromator, 320, which is used as a spectrograph dispersion element and images the mask 300 on the detector array 17, which is placed at the back focal plane of the monochromator. The detector array reads out the radiation field electronically. The spectrum is then recovered by matrix multiplication of the array output.

Figure 3:
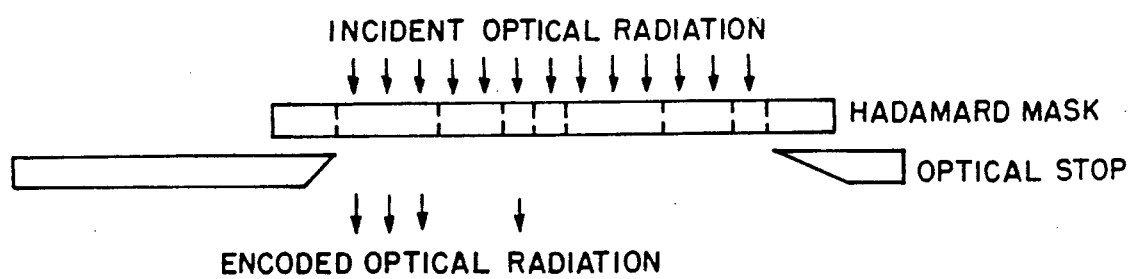
FIG. 3 is a sketch which depicts how a Hadamard mask encodes incident radiation with a Hadamard mask pattern.

In another embodiment of the invention, the dispersing element 320 of FIG. 3 may be a prism, as described in the Wajda patent. The operation of the detector array is understood in the art, and is shown in the above-cited references such as the Wajda patent. The arrays are available off-the-shelf from commercial vendors.

As mentioned above, state-of-the-art Hadamard spectroscopic systems include those which use a Hadamard mask at the entrance or exit slits of spectroscope detectors. The present invention replaces the single-slit entrance aperture with a Hadamard mask to admit more light, and encode the Hadamard mask pattern onto the spectrum. The Wajda patent mentions that prisms and gratings can be used as the dispersive element. These can be used also in the present invention, but the monochromator 320 of FIG. 2 is useful since it will isolate narrow portions of the spectrum by making use of the dispersion of light in its component colors.

The reason the Hadamard mask has $2n-1$ slits for a detector with n detectors is as follows. The spatially dispersed spectrum from the monochromator 320 will spatially shift light on the face of the detector for each shift in wavelength. Therefore you want nearly twice as many slits in the mask so that the portion of the spectrum of interest will remain on the face of the detector as the spectrum shifts in position over the face of the array. As mentioned above, the mask pattern is a cyclic S-matrix, so that the shift of each spectral element is recognizable on the detector array. It is anticipated that the present invention of FIG. 3 will improve the signal-to-noise ratio (SNR) of the spectrograph of FIG. 1 by $\sqrt{n}/2$ (where n equals the total number of photodetectors in the detector array 17.

Computer simulations of the system have shown that the system will provide a (square root n)/2 improvement in the signal-to-noise ratio for a line source.

The output from the detector array can be represented by a column matrix $D_r$. The relationship of the output to the spectrum is given, matrix notation, by $$D_r = \overline{S} \cdot \overline{T} \, \overline{E}$$

where $\overline{D}_r$ is the detector signal. The subscript r is a reminder that the indices must be read in reverse because the imaging process reverses the image on the focal plane.

$\overline{S}$ is the S-matrix, $\overline{T}$ is the transfer matrix which includes optical aberrations and efficiencies, and $\overline{E}$ is the input spectrum.

The input spectrum can be recovered by the matrix multiplication $$E = T^{-1} S^{-1} D_r$$

As mentioned above, the use of n open slits in the system of FIG. 2 provides an increased collecting aperture, and encodes the optical radiation received from the test sample.

Three basic procedures are used to maximize the capability of spectrometers to measure small amounts of optical energy. The first is to use the most sensitive detector possible. The second procedure is to maximize the energy collecting capability of the spectrometer, the optical throughput. The third is to maximize the measurement time. This may be accomplished by multiplexing or by using a detector array with many elements. Multiplexing is a technique that allows energy of many elements of the spectrum to be simultaneously collected onto a single detector. In multiplexing, the optical energy is encoded so that the energy in each spectral element can be found by decoding the detector signal. The energy in each spectral element is utilized for a larger percentage of the time with a multiplex spectrometer than it is by a spectrometer that measures each spectral element sequentially in time. If the dominant source of noise is either the detector or the signal-processing electronics, multiplexing improves the capability of a spectrometer to measure small amounts of optical energy.

If the entrance slit of a conventional monochromator is replaced with an encoding mask based on a Hadamard matrix, a multiplex spectrometer results. This multiplex spectrometer is referred to as a singly-encoded Hadamard spectrometer. If both the entrance and exit slits of a conventional monochromator are replaced with encoding masks based on Hadamard matrices, a multiplex spectrometer with an optical throughput greater than the monochromator results. This spectrometer is referred to as a doubly-encoded spectrometer.

The practical significance of the multiplex advantage of a singly-encoded Hadamard spectrometer is illustrated in FIG. 3. FIG. 3 is an illustration which depicts how a Hadamard masks receives incident optical radiation and outputs encoded optical radiation which represents the Hadamard mask pattern which implements the Hadamard matrix.

The intent of Hadamard spectroscopy is to increase the sensitivity of dispersive spectrometers by using encoding masks based on Hadamard matrices to encode the optical energy. In the Hadamard spectrometer of the present invention, the entrance slit of a conventional dispersive spectrometer is replaced with a Hadamard mask which provides an increased collection aperture.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A Hadamard spectrograph that obtains a spectrograph reading that identifies characteristics of a test sample, said Hadamard spectrograph comprising:
   a means for illuminating said test sample by illuminated it with a beam of light;
   a Hadamard mask which receives said beam of light emitted by said illuminating means after it has propagated through said test sample, said Hadamard mask having a plurality of slits through which said beam of light passes to produce thereby an encoded beam;
   a means for dispersing said encoded beam from said Hadamard mask to output a spatially dispersed spectral band in said encoded beam, wherein said dispersing means comprises a monochromator which receives and spatially disperses said encoded beam from said Hadamard mask to isolated narrow portions of received radiation and produce thereby said spatially dispersed spectral band; and a means for detecting said spectrograph reading in said test sample by receiving and detecting said spatially dispersed spectral band from said dispersing means, wherein said detecting means comprises a photodetector array with n photodiodes, where n is an integer, which are arranged in an array so that they receive and detect said spatially dispersed spectral band from said dispensing means to detect discrete bands of spectral energy dispersed upon the photodetector array's surface and output thereby an electrical detection signal which when multiplied by a matrix gives said spectrograph reading of said test sample, and wherein said Hadamard mask has at least $2n-1$ slots where n is the integer which indicates the number of photodiodes in the photodetector in the photodetector array, and wherein each of the slots of the Hadamard mask have a width which equals that of one of said photodiodes.

2. A Hadamard spectrograph that obtains a spectrograph reading that identifies characteristics of a test sample, said Hadamard spectrograph comprising:

a wide band light source that emits a beam of light with wavelengths that can include ultraviolet wavelengths, visible wavelengths, near infrared wavelengths and far infrared wavelengths;

a collimating lens which receives and collimates said beam of light from said wide band light source to output thereby a beam of collimated light;

a Hadamard mask which receives said beam of collimated light after it has been emitted by the collimating lens and has propagated through the test sample, wherein said Hadamard mask has $2n-1$ slots and wherein each of the slots have a width of a value W so that said beam of light passes through the slots to produce an encoded beam;

a prism for dispersing said encoded beam from said Hadamard mask to output a spatially dispersed spectral band in said encoded beam; and a photodetector array with n photodiodes, where n is the integer used to determine the number of slots in the Hadamard mask, said photodiodes being arranged in an array so that they receive and detect said spatially dispersed spectral band from said prism to photodetect discrete bands of spectral energy dispersed upon the photodetector array's surface and output thereby an electrical detection signal which contains said spectrograph reading of said test sample, and wherein each of said photodiodes has a width which equals the width of the slots in the Hadamard mask given by the value W.

* * * * *